May 7, 1940.   E. M. CLAYTOR   2,199,617
WIND SWITCH
Filed Feb. 28, 1938
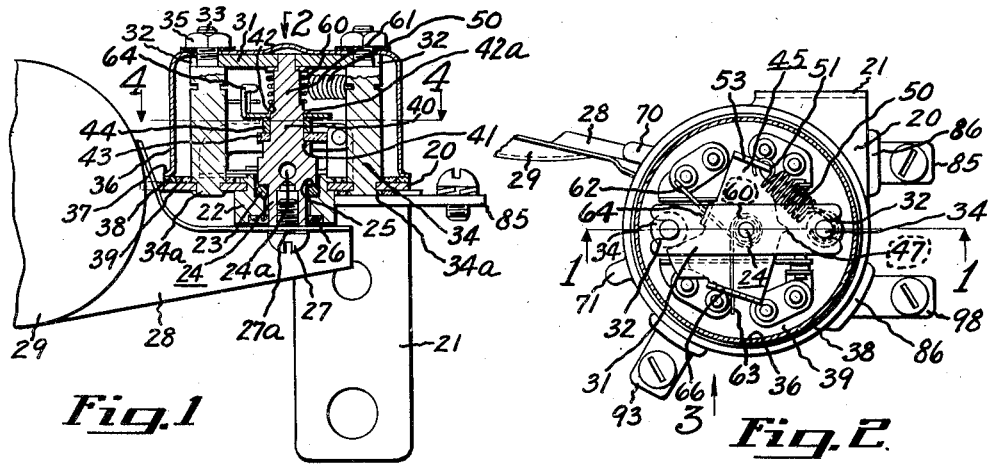
Fig.1
Fig.2
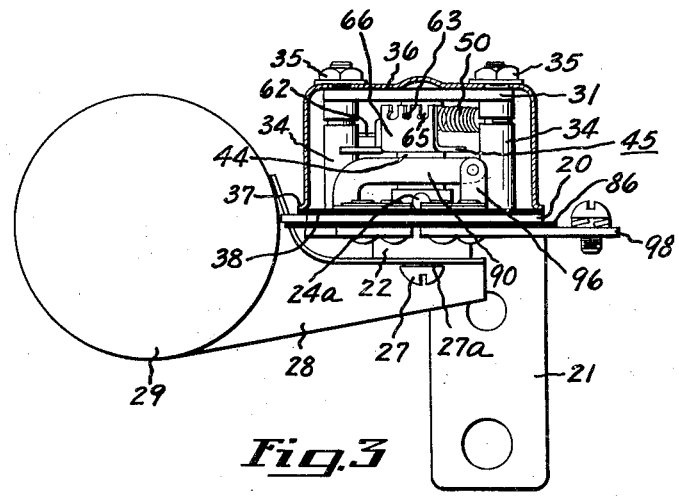
Fig.3
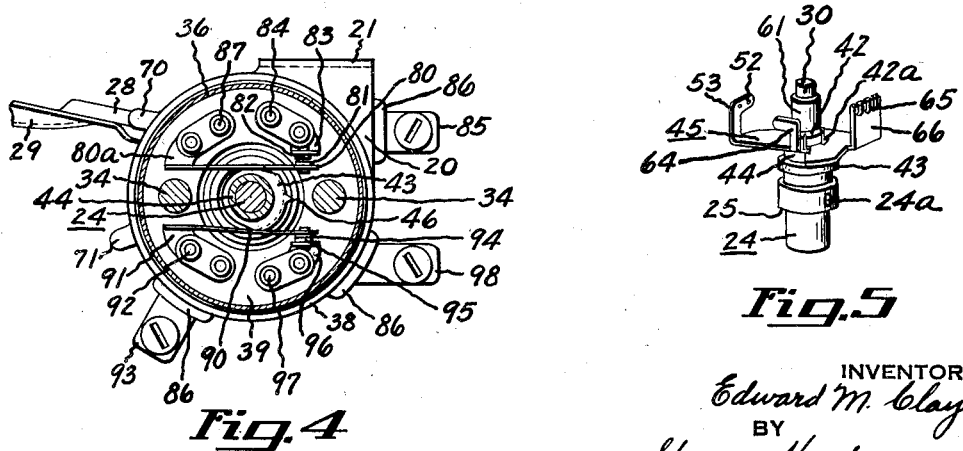
Fig.4
Fig.5
INVENTOR
Edward M. Claytor
BY
Spencer Hardman & Fehr
his ATTORNEYS Patented May 7, 1940

2,199,617

UNITED STATES PATENT OFFICE 2,199,617

WIND SWITCH

Edward M. Claytor, Anderson, Ind., assignor to General Motors Corporation, Detroit, Mich., a corporation of Delaware Application February 28, 1938, Serial No. 193,030

11 Claims. (Cl. 200—81)

This invention relates to electric switches operated by air pressure and, particularly, the type of switch which is adapted for automobile use or for use in connection with an electric generating plant operated by a wind wheel or propeller.

The chief object of the present invention is to provide a wind operated switch which is readily adapted for a variety of uses, particularly in connection with the automobile or wind operated generating plant.

To attain this object I provide a structure having an operating shaft to which a wind vane is attached, said shaft carrying a cam designed to operate upon a plurality of contact arms either simultaneously or successively, dependent upon the contour of the cam, the switch being adapted for various controlling operations by using the cams of different contour. Movement of the wind vane and shaft is resisted by one or more springs which can be adjusted to suit the requirements of the use to which the switch is put.

Further objects and advantages of the present invention will be apparent from the following description, reference being had to the accompanying drawing, wherein a preferred embodiment of one form of the present invention is clearly shown.

In the drawing:

Fig. 1 is a view partly in section, being taken on the line 1—1 of Fig. 2.

Fig. 2 is a view looking in the direction of the arrow 2 of Fig. 1, the switch case being shown in section.

Fig. 3 is a view looking in the direction of the arrow 3 of Fig. 2, the switch case being shown in section.

Fig. 4 is a sectional view on the line 4—4 of Fig. 1.

Fig. 5 is a perspective view of the operating shaft and certain parts assembled therewith.

The switch comprises a base 20 integral with a mounted bracket 21 by which the base may be attached to a suitable support, not shown. Base 20 carries a bushing 22 which provides the outer race for ball bearings 23, the inner race of which is provided by an operating shaft 24 having a shoulder 25 in contact with the balls 23. The shaft 24 extends through a felt packing washer 26 and is attached by a screw 27 to the arm 28 of a wind vane 29. The screw is retained in tightened position by lock washer 27a. The shaft 24 is provided with a hole 24a through which a rod may be passed so that the shaft 24 may be held from rotating while tightening the screw 27.

The upper end of the shaft 24 has a reduced portion 30 which is journalled in a bearing plate 31 having notched ends 32 each of which receives the threaded upper end of a post 34. Each post 34 is riveted at its lower end 34a to the base 20. The shaft 24 is therefore journalled in the bearings 23 and in the bearing plate 31. The plate 31 is secured in position by nuts 35 which also secure to the switch a cup-shaped cover 36 having holes through which the threaded ends 33 of the post 34 extend and having a flange 37 bearing against a gasket 38 of suitable packing material attached to the plate 20. Gasket 38 surrounds a disc 39 of nonconducting material attached to base 20.

The shaft 24 has a reduced portion 40 located between shoulders 41 and 42. The portion 40 receives three parts which are pressed over this reduced portion, namely, a cam 43 of nonconducting material, a metal spacing washer 44 and a spring anchoring member 45. These three members are secured in position by staking or upsetting, as indicated at 42a in Figs. 1 and 5, portions of the shoulder 42 of the shaft 24.

The cam 43 carries a point or index 46, as shown in Fig. 4, and the spring anchoring plate 45 carries a point or index 47. These indices or points 46 and 47 are related to other parts of the cam 43 and plate 45, respectively, in a predetermined manner. By so locating the cam 43 and the plate 45 so the points 46 and 47 are in alignment, the cam 43 and the plate 45 will be located in a predetermined relation with respect to each other. This is desirable in order that the movement of the cam 43 may be correlated with the deflections of the control springs which are anchored to the plate 45.

One of these control springs is a helical coil spring 50 fixed at one end to the right-hand post 34, as viewed in the drawing, and having a hook-end 51 which can be inserted in either one of a plurality of holes 52 provided in a lug 53 integral with the plate 45 as shown best in Fig. 5. The tension of the spring 50 can be varied according to which one of the holes 52 the hook 51 is inserted. For finer adjustment of the spring 50, the lug 53 can be bent closer to the shaft 24 or away from it. The second control spring is a spring 60 having a helical portion surrounding the reduced portion 61 of the shaft 24 and having its ends 62 and 63 biased toward each other. The spring end 62 is biased counter-clockwise against a lug 64 provided by the plate 45, and the end 63 which is biased counter-clockwise, is received by any one of a series of notches 65 provided by lug 66 integral with the plate 45. The biasing force exerted by the spring 60 causing its ends 62 and 63 to move toward each other as viewed in Fig. 2 can be varied according to which one of the notches 65 receives the spring end 63. Initially the spring 60 is inoperative to resist motion of the shaft 24 in a counter-clockwise direction as viewed in Fig. 2. Initially, this motion is resisted only by the spring 50 which urges the shaft 24 clockwise so that the vane arm 28 normally engages a stop-lug 70 integral with the base 20. As the shaft 24 turns counter-clockwise as viewed in Figs. 2 and 4 due to wind pressure impinging upon the concave surface of the vane 29, the spring 50 is stretched. As the action line of the spring 50 approaches the axis of the shaft 30, the extension of spring 50 per increment of angular movement of shaft 24 is decreasing and the leverage of spring 50 is also decreasing. After spring 50 has been extended a certain amount the resisting force of spring 50 is supplemented by the spring 60. This occurs after the shaft 24 has rotated sufficiently counter-clockwise to bring the spring-end 62 into engagement with the left-hand post 34. Further movement of the shaft 24 counter-clockwise causes the anchor plate 45 to move around carrying with it the spring-end 63, while the lug 64 separates itself from the spring-end 62 which remains in contact with the left-hand post 34. By properly adjusting the spring 60, the degree to which it assists the spring 50 can be varied to suit the requirements. Obviously the springs 50 and 60 are designed to suit a particular condition. The load deflection characteristics of these springs will vary according to the stiffness of wire used and the number of turns. The switch structure is adapted to accommodate springs of varying load deflection characteristics. Hence the switch is made adaptable to a variety of uses by changing the springs.

Referring to Fig. 4, the cam 43 is intended to operate upon a plurality of contact arms, one of which is an arm 80 carrying a contact point 81 engageable with a stationary contact point 82 by stationary contact bracket 83. The contact bracket 83 is insulatingly supported by the plate 20 and is attached thereto by rivets 84 which electrically connect the bracket 83 with a terminal plate 85 secured to the underside of plate 20 and insulated therefrom by insulating plate 86. The contact arm 80, which is made preferably of phosphor bronze, is integral with bracket 80a secured by rivets 87 to the plate 20. Bracket 80a may be insulatingly carried by the plate 20 and may be connected with a terminal like the terminal 85 if desired, but in the disclosed form of switch the bracket 80a is grounded on the frame 20 by the rivet 87.

The cam 43 operates also upon a contact arm 90 preferably of phosphor bronze integral with a bracket 91 which is insulatingly supported by the plate 20 and is attached thereto by rivet 92 which electrically connects the bracket 91 with a terminal 93 which is insulated from the base 20 by the insulating plate 86. The contact arm carries a contact point 94 engageable with a stationary contact point 95 attached to the contact bracket 96 insulatingly carried by the plate 20. The bracket 96 is secured to the plate 20 by rivet 97 which electrically connects the bracket 96 with a terminal 98 also insulated from the plate 20 by insulation member 86. Plate 86 is a common insulating member on the underside of base 20, and disc 39 is a common insulating member on the upperside of base 20.

The spring arms 80 and 90 are biased so as to open the contacts when permitted to do so. Contacts 94 and 95 are normally closed and contacts 81 and 82 are normally open. Cam 43 normally holds the arm 90 in contact-closing position. While the shaft 24 rotates counter-clockwise under the action of wind pressure upon the vane 29 the contacts 94 and 95 will separate and the contacts 81 and 82 will be closed and this condition will exist at the time the vane arm 28 strikes against the stop 71 which limits the vane at the highest wind pressure. Therefore the disclosed embodiment of the present invention provides a switch in which one pair of contacts is closed and the other pair open at relatively low wind pressure and in which the condition of the pairs of contacts is reversed at relatively high wind pressure.

The disclosed form of switch finds useful application on an automobile. The vane 29 is located in the path of an air current induced by the engine cooling fan. This fan, being driven by the engine, effects movement of the vane 29 substantially in accordance with engine speed. The normally closed contacts 94 and 95 can be utilized to short out a resistance element for controlling the field excitation of the generator. When the contacts 94 and 95 are closed this resistance will be short-circuited so that the field resistance will be low at relatively low engine speed. As the engine speed increases, the generator speed will increase to increase the charging rate upon the automobile storage battery. At a predetermined engine speed the wind pressure exerted by the cooling of the fan upon the vane 29 will be sufficient to overcome the resistance of the spring 50 and the shaft 24 will turn counter-clockwise to open the contacts 94 and 95. This will open the short circuit around the resistance element and reduce the field excitation at that speed in order to keep the battery charging rate within safe limits. The generator field controlling circuit is not shown since it is well known to those skilled in the art and needs no illustration in the present application. The generator field controlling resistance would be connected between the terminals 93 and 98.

The other pair of contacts 81 and 82, which are normally open, may be used to control other circuits in the automobile, for example to render operative a signal, either visual or audible, to indicate to the driver and passengers of an automotive vehicle that a certain speed limit has been exceeded. This would be particularly useful on automotive passenger buses. Another use to which the contacts 81 and 82 could be used would be to render operative the circuit of a loud sounding horn so that this circuit will be closed by the main horn button when driving at a predetermined high speed. This would be particularly useful on an automobile where a soft tone horn is used in city driving and a loud tone horn is used when driving in the country above a certain speed. Obviously there are many other uses to which an air operated switch embodying the present invention could be adapted.

The present switch is also well adapted for use in controlling a wind wheel driven generator for charging a storage battery or supplying current to other electrical devices. In my copending appication, Serial No. 194,283 filed March 7, 1938, I disclose the control of the generator field current in a manner intended to obtain the highest efficiency from the power plant. That application discloses two field resistances each controlled by a switch. The status of these switches is dependent upon wind velocity; therefore, the switches are operated in a predetermined relation to each other by a vane located in the air current which operates the wind wheel. The switch of the present application is particularly well adapted for such use because it provides two switches. By properly designing the cam 43 these switches can be made to operate in any predetermined sequence.

While the embodiment of the present invention as herein disclosed constitutes a preferred form, it is to be understood that other forms might be adopted, all coming within the scope of the claims which follow.

What is claimed is as follows:

1. A wind operated switch comprising a rotatable shaft, a wind pressure vane attached to the shaft, a cam carried by the shaft, a switch contact arm actuated by the cam, a coiled spring and a spring anchor plate attached to the shaft in predetermined relation to the cam and with which the spring cooperates to resist movement of the shaft after the shaft has moved a certain distance.

2. A wind operated electric switch comprising, a rotatable shaft, a wind pressure vane attached to the shaft, a plurality of switches each having a movable contact arm, a single cam attached to the shaft and operating the movable contact arms, said cam normally holding one of the arms in a switch closed position and operable upon another arm to close another switch when the wind pressure impinged against the vane reaches a predetermined value, a plurality of springs acting cumulatively to resist the rotation of the shaft, and separate adjusting means for each spring.

3. A wind operated electric switch comprising, a rotatable shaft, a wind pressure vane attached to the shaft, a plurality of switches each having a movable contact arm, a single cam attached to the shaft and operating the movable contact arms, said cam normally holding one of the arms in a switch closed position and operable upon another arm to close another switch when the wind pressure impinged against the vane reaches a predetermined value, a plurality of springs for resisting the rotation of the shaft, said springs being arranged so that the shaft is resisted initially by one spring and then by all of the springs acting cumulatively.

4. A wind operated electric switch comprising, a rotatable shaft, a wind pressure vane attached to the shaft, a plurality of switches each having a movable contact arm, a single cam attached to the shaft and operating the movable contact arms, said cam normally holding one of the arms in a switch closed position and operable upon another arm to close another switch when the wind pressure impinged against the vane reaches a predetermined value, a plate carried by the shaft, the plate and cam being located on the shaft in a predetermined relative location, and a spring having one end anchored to the plate, said spring operating to resist the rotation of the shaft.

5. A switch according to claim 1 in which the resisting spring is a helical spring having a hook received by one of a plurality of holes in a bendable lug provided by the spring anchor plate.

6. A switch according to claim 1 in which the resisting spring is a helical spring surrounding the shaft and having a spring end biased against a lug provided by the anchor plate, said lug having a plurality of notches each for receiving the spring end.

7. A switch according to claim 1 having two resisting springs, one being an initially operative helical tension spring anchored to the plate and to a stationary part, and the other being an initially, non-operating, helical torsion spring the ends of which are biased against lugs provided by the anchor plate, one of the spring ends engaging a stationary part during the movement of the shaft away from normal position.

8. An electric switch comprising, a rotatable shaft; a vane attached to the shaft; stop means cooperating with the vane for limiting the movement of the vane in either direction of rotation; a plurality of switches each having a movable contact arm; a cam attached to the shaft and operating the movable arms; and spring means for urging the shaft in one direction and the vane against one of the stop means and for causing the cam to hold normally one of the arms in a switch closed position, said vane responding to means opposing the springs and moving the shaft in the opposite direction to move the cam to operate another arm to close another switch when the shaft has moved a predetermined distance in said opposite direction against the tension of the spring means, said spring means being effective to move the shaft in said one direction as the opposing means is reduced.

9. A switch mechanism comprising, a support; a movable contact pivoted relative to the support; a rotatable shaft; a cam fixed to the shaft and adapted to actuate the contact; a plate fixed to the shaft; a coil spring surrounding the shaft and having its ends biased against lugs provided by the plate; a stationary part carried by the support and located in the path of one end of the spring; means for urging the shaft in one direction causing the cam to actuate the movable contact into engagement with a stationary contact and causing the said one end of the spring to engage the part after a predetermined movement of the shaft whereby the tension of the spring is increased to resist movement of the shaft in said one direction, said spring being effective to urge the shaft in the opposite direction as the urging means is reduced.

10. An electric switch comprising, a support, a shaft, a pivoted contact, a cam and a plate fixed to the shaft, a spring associated with the plate for urging the shaft in one direction; a stationary part fixed to the support and located in the path of one end of the spring; power means for rotating the shaft in one direction causing the cam to operate the contact into engagement with a stationary terminal and causing one end of the spring upon a predetermined movement of the shaft in said one direction to engage the stationary part whereby the spring will resist movement of the shaft in said one direction, said spring being effective to rotate the shaft in the opposite direction as the power means is reduced and means associated with the shaft cooperating with means on the support to limit the turning of the shaft in either direction of rotation.

11. A switch mechanism comprising in combination; rotatable shaft; a movable member carried by the shaft; a switch contact arm actuated by the movable member; a plate attached to the shaft in predetermined relation to the movable member; means for urging the shaft in one direction of rotation; a plurality of springs for resisting movement of the shaft in one direction, one of the springs being anchored to the plate and to a stationary part and another spring being initially, non-operating, the ends of which are biased against projections provided by the plate, one of the spring ends adapted to engage a stationary part after a predetermined movement of the shaft away from normal position, said springs automatically moving the shaft in the opposite direction in accordance with the bias of the springs upon retraction of the urging means; and means to limit the rotation of the shaft in either direction of rotation.

EDWARD M. CLAYTOR.